United States Patent [19]

Krambeck et al.

[11] Patent Number: 4,640,463
[45] Date of Patent: Feb. 3, 1987

[54] APPARATUS FOR INJECTING LIQUID HYDROCARBON FEED AND STEAM INTO A CATALYTIC CRACKING ZONE

[75] Inventors: Frederick J. Krambeck, Cherry Hill; Stephen J. McGovern, West Deptford Township, Gloucester County, both of N.J.; John E. Sauer, Washington Crossing, Pa.

[73] Assignee: Mobil Oil Corporation, New York, N.Y.

[21] Appl. No.: 770,940

[22] Filed: Aug. 30, 1985

Related U.S. Application Data

[62] Division of Ser. No. 572,039, Jan. 19, 1984, Pat. No. 4,555,328.

[51] Int. Cl.$^4$ .............................................. B05B 7/00
[52] U.S. Cl. ................................. 239/424; 239/424.5; 239/553
[58] Field of Search ...................... 239/418, 424, 424.5, 239/425, 434.5, 553; 208/157

[56] References Cited

U.S. PATENT DOCUMENTS

| 123,536 | 2/1872 | Wilkinson | 239/424 |
| 1,518,412 | 12/1924 | Ross | 239/553 |
| 1,612,457 | 12/1926 | Marron | 239/424 |
| 2,702,080 | 2/1955 | Gee | 239/424 X |

FOREIGN PATENT DOCUMENTS 352292 10/1922 Fed. Rep. of Germany ...... 239/425

Primary Examiner—Andres Kashnikow
Attorney, Agent, or Firm—Alexander J. McKillop; Michael G. Gilman; Dennis P. Santini

[57] ABSTRACT

An apparatus for atomizing a liquid hydrocarbon feed and injecting it into a reaction zone, such as a riser conversion zone or a dense fluid bed reactor of a fluid catalytic cracking unit, is disclosed. The hydrocarbon feed passes through a central passage with steam flowing concurrently in a concentrically aligned passage. By providing a flow restriction means in each hydrocarbon passage and each steam passage, substantially equal quantities of hydrocarbon and steam can be supplied to each of a plurality of hydrocarbon-steam nozzles so as to provide a uniform dispersion of small droplets of hydrocarbons.

10 Claims, 6 Drawing Figures

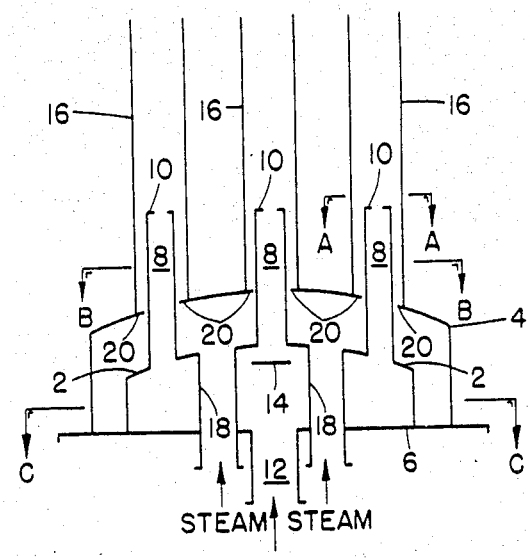
FIG.1
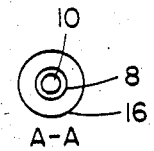
FIG.2-A
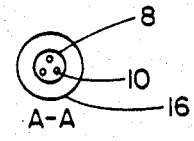
FIG.2-B
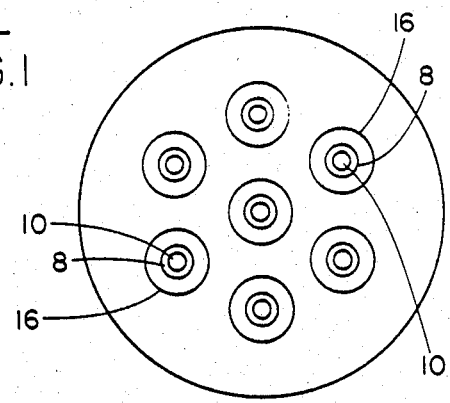
FIG.3
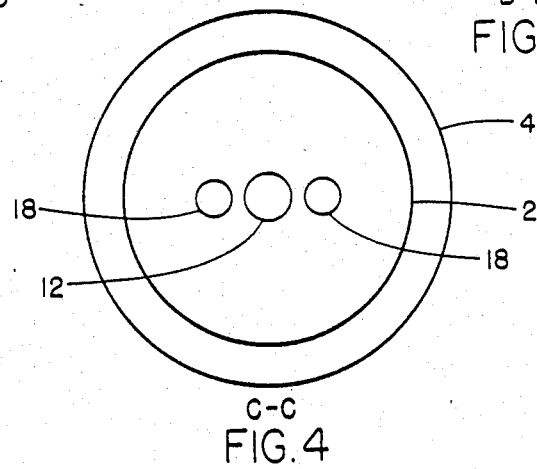
FIG.4

APPARATUS FOR INJECTING LIQUID HYDROCARBON FEED AND STEAM INTO A CATALYTIC CRACKING ZONE

CROSS REFERENCE TO RELATED APPLICATION

This application is a division of U.S. application Ser. No. 572,039, filed Jan. 19, 1984, now U.S. Pat. No. 4,555,328.

BACKGROUND OF THE INVENTION

1. Field of the Invention

This invention relates to the catalytic conversion of hydrocarbons with a fluidized catalyst. More particularly, it relates to the catalytic cracking of a hydrocarbon stream injected into the catalytic cracking zone in the liquid phase. This invention especially relates to injecting a liquid hydrocarbon feed into a catalytic cracking zone together with dispersion steam in a manner which provides uniform distribution of hydrocarbon feed and steam.

2. Description of the Prior Art

Fluid catalytic cracking of petroleum fractions is a well-established refinery operation. The catalytic cracking apparatus usually comprises a reactor section where catalytic cracking occurs coupled with a regenerator section where coke deposited on spent catalyst is burned. The process operates essentially as follows. Fresh feed, which may be preheated, is mixed with catalyst and undergoes cracking within the reactor section. Products are removed from the reactor in the vapor phase and passed to a products recovery station comprising at least one main fractionator or distillation column for separation of the products into desired fractions. Spent catalyst, which has been coked by the cracking reaction, is continuously passed from the reactor to the regenerator by a spent catalyst transfer line. In the regenerator, the coke is burned by contact with an oxygen containing gas. Flue gas is passed from the regenerator, and regenerated catalyst is recirculated to the reactor via a standpipe where it is picked up by the fresh feed hydrocarbon charge stream. The catalyst itself is finely divided and simulates a fluid in various portions of the catalyst section, whence the name of the process. In a typical operation, heat generated in the regenerator is carried by the hot regenerated catalyst to the reactor to supply heat for the endothermic cracking reaction. Typical fluid catalyst cracking systems are disclosed in U.S. Pat. Nos. 3,206,393 of Pohlenz and 3,261,777 of Iscol, et al.

The fluid catalytic cracking process has been improved in efficiency over the years. In particular, the discovery of zeolite catalysts with their greater activity and reduced coke make, and improvements in design of the reactor section to emphasize dilute phase cracking, are cases in point. Systems for dilute phase cracking, also known in the art as riser cracking or transfer line cracking are typically disclosed in U.S. Pat. Nos. 3,261,776 of Baumann, et al., 3,448,037 of Bunn, et al. and 3,894,935 of Owen.

In the catalytic cracking of petroleum hydrocarbons, the fresh feed stream has been usually preheated before being injected into the reaction zone for contact with the cracking catalyst. In some instances, sufficient heat has been supplied to vaporize the hydrocarbons so that they were injected as a vapor. However, the energy required for complete vaporization often proved uneconomical. Alternately, injecting the hydrocarbons into the reaction zone in the liquid phase was employed. This often did not prove satisfactory since poor catalyst-oil mixing was obtained and excessive coking and attendant product loss were experienced. It was eventually found that injecting the hydrocarbon feed as a liquid in finely divided form, i.e., as atomized liquid droplets, prevented the undesirable effects of coking and product loss experienced when liquid feed was injected as a continuous individual stream into a catalytic cracking zone. The use of an atomized liquid feed has been usefully employed in both riser cracking and dense bed cracking units, although it was found that proper feed injection was less critical in a dense bed unit than in a transfer line reactor.

A variety of techniques has been employed in the art to provide a hydrocarbon feed in atomized form for use in the conversion zone. In U.S. Pat. No. 2,952,619 of Metrailer, et al., a heavy hydrocarbon feed is passed through the inner passage of a feed nozzle having a grooved circumferential surface which defines a threaded passage for the oil. Steam is passed through an annular passageway surrounding the oil passage. As the oil passes through its passageway a spinning component of motion is imparted to the oil forcing it outwards as a hollow cylindrical film. As the steam is emitted from the nozzle it shears the cylindrical film of oil shearing and atomizing it into relatively fine droplets. The nozzle of Metrailer, et al. is particularly useful in transfer line coking of residuum.

The oil feed system for a fluid cracking unit disclosed in U.S. Pat. No. 3,071,540 of McMahon, et al. employs two concentrically arranged nozzles. The nozzles are arranged to provide for concurrent flow of oil through the inner nozzle and steam through the outer nozzle. The inner nozzle terminates inside the outer nozzle so that as the oil passes from the exit of the inner nozzle it is contacted with high velocity steam and then the combination of steam and oil passes through the exit of the outer nozzle. The net result of this arrangement is to cause the steam to shear the hydrocarbon feed into relatively fine droplets. One or more of these nozzles is employed in the lower portion of a dense fluidized bed reactor with a single nozzle arranged in a riser or transfer line reactor.

A swirling or spiral motion similar to that imparted to the oil in the nozzle of Metrailer, et al. is employed in the oil-steam nozzle disclosed in U.S. Pat. Nos. 3,152,065 of Sharp, et al. and 3,654,140 of Griffel, et al. In one of the embodiments of Griffel, et al., the liquid hydrocarbon feed passes through the tube of the nozzle which is provided with a spiral or helix to cause the hydrocarbon to exit from the nozzle in the form of a hollow conical sheet. Surrounding the oil feed tube is a larger diameter tube concentrically disposed about the inner tube. Steam passes through and emmanates from the annular passageway contacting the expanding cone of oil, rapidly breaking it into discrete and small droplets. The nozzle of Sharp, et al. also consists of two concentrically disposed tubes but here the oil passes through the annular passageway and the steam through the inner tube. The annular passageway is provided with a helical assembly to impart a spiral motion to the hydrocarbon feed. The outer tube extends past the end of the inner tube and is provided at its downstream end with an orifice plate only slightly larger in diameter than the internal diameter of the inner tube. The centrifugal swirling motion imparted to the oil causes it to pass through the restriction orifice in the form of an annular cone-shaped wall of liquid. The steam passing inside this liquid annulus causes the liquid to break up into uniform liquid hydrocarbon droplets. In optional embodiments, a plurality of nozzles may be installed in a vertical riser cracking line to discharge the feed stock vertically or at an angle to the direction of flow.

It has been found that nozzles employing a helical or spiral device to impart a swirling motion to the oil can encounter plugging problems, particularly with heavy feedstocks, and require higher inlet pressures than other types of injection means.

It has also been found that although multiple nozzles have been employed to provide uniform distribution of feedstock across the cross section of the reaction zone thereby achieving efficient contacting of oil and catalyst, it has not been possible heretofore to insure that all nozzles receive equal quantities of steam and oil when each is supplied from a common source so that the desired uniform distribution is often not obtained.

It is an object of this invention to provide a process for supplying uniform quantities of steam and oil to each discharge port of a multiple port oil-steam nozzle.

It is another object of this invention to provide a multiple port oil-steam nozzle which will supply a uniform distribution of oil feedstock across the cross-section of a reactor.

It is a further object of this invention to provide a process for supplying a continuous stream of atomized liquid hydrocarbon to a catalytic reaction zone.

The achievement of these and other objects will be apparent from the following description of the subject invention.

SUMMARY OF THE INVENTION

In accordance with the present invention, it has been found that substantially equal quantities of steam and oil can be provided to each discharge port of a multiple discharge port oil-steam nozzle if the oil and steam to each discharge port are each passed through a flow restriction means.

In particular, this invention relates to a process of injecting a liquid hydrocarbon feedstock into a catalytic conversion zone which comprises:

(a) passing the liquid hydrocarbon feedstock, at a temperature effective to maintain said feedstock as a liquid at the pressure of said catalytic conversion zone, in parallel fashion through at least two confined passageways, each of said passageways having, at the downstream thereof, a first flow restriction means effective to provide substantially the same flow rate of said feedstock through each of said confined passageways;

(b) passing a gaseous material in parallel fashion through at least two annular passageways, each of said annular passageways having a confined passageway extending longitudinally through a portion thereof in concentrically spaced relationship and each of said annular passageways having at the upstream end thereof a second flow restriction means effective to provide substantially the same flow rate of said gaseous material through each of said annular passageways;

(c) admixing said feedstock discharging from said first flow restriction means with said gaseous material, the relative linear velocity of said feedstock and said gaseous material being effective to atomize said feedstock to provide finely divided liquid droplets; and feedstock to provide finely divided liquid droplets; and (d) passing the admixture of step (c) into a catalytic conversion zone.

This invention also relates to a nozzle apparatus for injecting a liquid hydrocarbon feedstock into a catalytic conversion zone which comprises:

(a) at least two confined passageways arranged to provide parallel fluid flow;

(b) a first flow restriction means concentric with and affixed to the downstream end of each confined passageway;

(c) at least two annular passageways, each of said annular passageways having a confined passageway extending longitudinally through a portion thereof in concentrically spaced relationship; and (d) a second flow restriction means concentric with and affixed to the upstream end of each annular passageway.

BRIEF DESCRIPTION OF THE DRAWINGS

FIG. 1 is a diagrammatic sketch in elevation of an oil-steam nozzle in accordance with the subject invention.

FIGS. 2A & B, 3 and 4 are drawings of sections A—A, B—B and C—C of FIG. 1, respectively.

DESCRIPTION OF THE PREFERRED EMBODIMENTS

Figure 5:
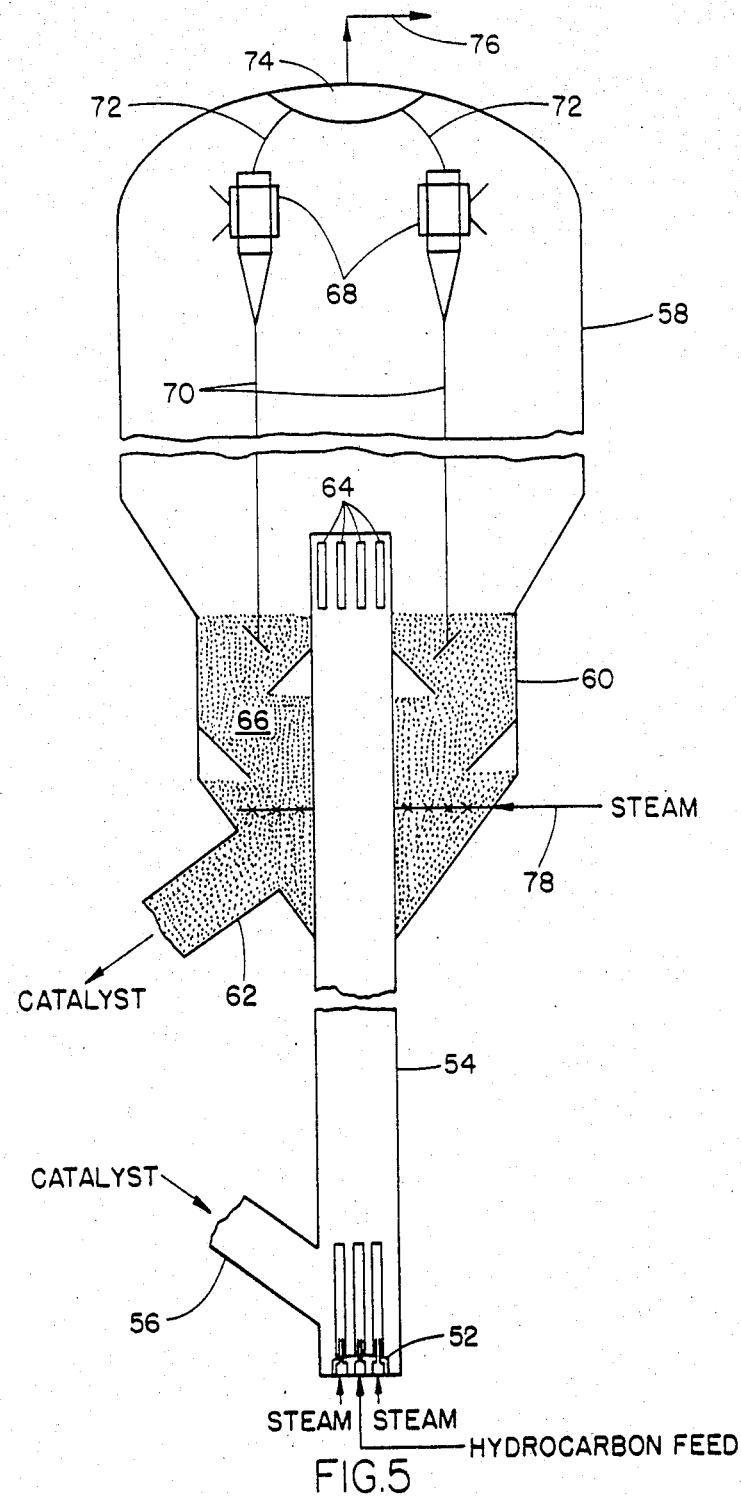
FIG. 5 is a diagrammatic sketch in elevation of a riser conversion zone terminating in a catalyst separation and stripping zone, incorporating an oil-steam nozzle of the invention in the lower portion of the riser conversion zone.

The present invention relates to a process and an apparatus for atomizing a liquid hydrocarbon feed and injecting it into a reaction zone. In its most conventional embodiment, this invention concerns atomizing the hydrocarbon feed to a fluid catalytic cracking reactor, either a riser reactor or a dense fluid bed reactor, by passing the liquid feed through a plurality of discharge ports and employing steam flowing in concentrically aligned passages to cause the feed to be sub-divided into small droplets of uniform size. A uniform distribution of liquid droplets is provided by means of employing flow restriction means in each oil and steam conduit for each port of the nozzle. In this fashion substantially equal quantities of oil plus steam will discharge from each of the several ports of the nozzle.

The catalytic cracking of hydrocarbons, such as a gas oil hydrocarbon feed material, is practiced at a temperature within the range of 900° F. up to about 1200° F. with the temperature more usually restricted to less than 1100° F. Operating pressures within the range of atmospheric up to 100 psig may be employed, it being preferred to select conditions assuring good catalyst circulation, product and reactant flow which will contribute to the overall economics of the operation. In a riser conversion operation the hydrocarbon reactant is mixed with hot catalyst particles in the bottom of the lower portion of the riser to form a suspension at a desired cracking temperature and the suspension is passed through the riser conversion zone under space velocity conditions providing a hydrocarbon residence time in the riser within the range of 1 to 15 seconds and more usually less than about 10 seconds. The suspension is discharged from the riser outlet into cyclonic separation zones or the suspension may be discharged from the riser into an enlarged zone wherein separation of catalyst particles from gasiform material such as hydrocarbon vapors is accomplished by a reduction in velocity thereby causing the catalyst particles to settle out. Cyclonic separating means may also be relied upon to remove particles of catalyst from vaporous material not removed by the reduced velocity. The hydrocarbon vapors are recovered and separated in a product fractionator. The catalyst particles are stripped to remove entrained hydrocarbons and the stripped catalyst may be passed to catalyst regeneration.

In the concept of this invention a liquid hydrocarbon feed is passed through a plurality of passageways, arranged to provide parallel fluid flow, and discharged therefrom simultaneously with the discharge of steam from an equal number of passageways, each of which is arranged in a concentric fashion with each of the hydrocarbon passageways in a manner effective to cause the liquid hydrocarbon to be atomized into fine liquid droplets of uniform size. The finely dispersed hydrocarbon feed is injected into a catalytic conversion zone where it is contacted with finely divided catalytic cracking catalyst under conditions effective to crack the hydrocarbon fee. In the preferred embodiment, the injection nozzle is located in a riser conversion zone; however, it may also be effectively employed in a dense bed fluid reactor. For convenience, the following description of the invention will utilize the riser cracking embodiment but those skilled in the art will understand that the invention can be utilized in a dense bed fluid reactor with similar advantageous results by making appropriate modifications.

An embodiment of the nozzle assembly of the invention is illustrated in FIG. 1. This particular design can be bolted in place in the bottom of a riser. It can be constructed as a integral unit by employing two concentric dished heads 2 and 4 which are affixed to bottom plate 6. The required number of oil feed nozzles 8 extend vertically from inner head 2. Each oil nozzle 8 is capped with a flow restriction device 10 which, as shown in section A—A, may be a discharge orifice (FIG. 2A) or a perforated plate having 2, 3 or more openings (FIG. 2B). Dished head 2 also serves as a flow restriction means for oil passing to the upstream end of oil nozzle 8. Oil is fed at about 50 to 75 psig into inner dished head 2 through pipe 12. Deflector plate 14 is located above inlet pipe 12 to distribute the oil to all the oil feed nozzles. Located concentrically to each oil feed nozzle 8 and extending vertically from outer dished head 4 are a number of major nozzles 16 which extend vertically past the end of the oil feed nozzles. Steam at about 100 to about 150 psig is introduced into outer dished head 4 through at least two pipes 18 which supply all the major nozzles from the space between the inner and outer dished heads. Each major nozzle 16 is provided at its upstream end with a flow restriction means 20 which is depicted in FIG. 1 as an annular orifice. FIG. 3 shows section B—B which is a seven nozzle assembly while FIG. 4 depicts section C—C to indicate the relative location of the oil and steam inlet pipes in the bottom plate.

A seven nozzle assembly is a preferred embodiment since it can provide a uniform distribution of liquid hydrocarbon droplets and steam across the cross-sectional area of the riser conversion zone. Other nozzle assemblies having 3, 4, 5 or 6 nozzles provide more uniform distribution than 1 or 2 nozzle assemblies and may be employed where space restrictions or other considerations require limiting the number of nozzles. However, the seven nozzle assembly is preferred in most riser conversion zone applications. In dense fluid bed situations, a number of these nozzle assemblies may be located in the lower portion of the reactor vessel to inject the hydrocarbon feed in an optimum fashion. When a nozzle assembly is located below the distribution plate, the distribution plate may be relied on to further assist in assuring even distribution of the feed throughout the fluid bed so that the precise location of the nozzle assemblies, the number of nozzle assemblies and the number of nozzles per assembly are not as critical in this particular application as in the case of a riser conversion zone. One skilled in the art can, therefore, utilize his judgment when employing the nozzle assemblies in dense fluid bed reactors.

The feedstock employed in the practice of this invention may be any of the usual feedstocks processed in a commercial fluid catalytic cracking unit of either the riser cracking or dense bed cracking type. Such feeds include virgin gas oil, cycle gas oil, reduced crudes and resids. Thus, the feed may boil in the range of 400°–1000° F. and higher.

Again referring to FIGS. 1–4, the liquid hydrocarbon feed, such as a heavy gas oil, is provided at a temperature of about 150°–800° F. It may be necessary to some instances preheat the feed to provide the necessary temperature. The feed is introduced to the oil-steam injection nozzle of FIG. 1 through pipe 12 into inner dished head 2. The gas oil is distributed to each of the several oil feed nozzles 8. Simultaneously, steam is fed into outer dished head 4 through pipes 18 and is distributed to each of the several major nozzles 16. Flow restriction devices 10 and 20 are located in each of the oil feed nozzles 8 and the major nozzles 16, respectively. These flow restriction devices are sized so as to distribute the oil (or steam) evenly to each of the nozzles. In most instances, an orifice will be employed as the flow restriction means at the end of the oil nozzle. However, other means, such as a perforated plate having two to six holes may be employed to provide liquid droplets of a size which is preferred. Whichever type is selected, it must be selected to provide the required drop size for the particular feed while at the same time providing an operation substantially free from plugging. The steam, which flows in the annular space, is effectively controlled with an annular orifice, located at the entrance of each major nozzle, serving as the flow restriction means.

In most applications, the flow restriction means should provide a pressure drop of about 2 to about 5 psi for each gas oil nozzle while the pressure drop across each steam flow restriction means should be about 5 psi at minimum steam flow. The feedstock discharges from the flow restriction means at the end of the oil nozzle at a velocity of between about 5 and about 100 ft/sec. while the steam discharges from the flow restriction means in the annular space at a velocity of between about 10 and about 200 ft/sec. The major nozzle is sized to provide an exit velocity of the steam-oil mixture of about 10 to about 90 ft/sec. As the oil is discharged through the flow restriction device at the end of the oil nozzle, it contacts the steam under conditions which cause the oil to be atomized into liquid droplets of fairly uniform size. The liquid droplets are less than about 350 microns in diameter, preferably, less than about 100 microns in diameter. In many oil-steam nozzles employed in fluid catalytic cracking units, the system is in the annular flow regime with oil flowing on the walls of the pipe or nozzle and steam flowing in the center of the passageway. To avoid this condition when practicing the present invention the length of major nozzle 16 extending beyond each oil nozzle should be sufficiently short so that annular flow is not established. The annular flow condition is avoided in most instances if the major nozzle terminates in a distance not more than about two diameters downstream of the end of the oil nozzle, the diameter in this case being the inside diameter of the annular passageway, i.e., the outside diameter of the oil nozzle.

Those skilled in the art can appreciate from the above discussion that the individual nozzles and the flow restriction means must be designed utilizing the above parameters to provide an oil-steam mixture where the oil is atomized into droplets of fairly uniform size having the above described properties. It will also be appreciated that where feedstocks of widely varying properties are to be processed in a particular catalytic cracking unit it may be necessary to design and provide different nozzle assemblies for each feed in order to achieve optimum performance of the unit.

As discussed above, the preferred use of the process and apparatus of this invention is in a fluid catalytic cracking unit employing riser cracking. Referring to FIG. 5, there is depicted the reactor portion of such a cracking unit. The regenerator portion is not depicted since its structure and use are well-known to those skilled in the art. Nozzle assembly 52, constructed in accordance with this invention, is located in the bottom of riser conversion zone 54. Conduit means 56 supplies hot regenerated catalyst to the lower portion of riser 54. The upper end of riser 54 terminates in separation zone 58 which is provided with catalyst stripping zone 60 and spent catalyst withdrawal conduit 62 in the lower portion thereof. During operation, hydrocarbon feed and steam are introduced into nozzle assembly 52 which causes the liquid feed to be atomized and dispersed into the lower end of riser 54 where it forms a suspension with hot regenerated fluid cracking catalyst supplied at about 900° F. through conduit 56. A suspension is formed with the dispersed and vaporized oil and catalyst which is then moved under selected velocity conditions upwardly through the riser. In the arrangement of FIG. 5, the suspension passing upwardly through the riser is discharged through slotted openings 64 in the upper extreme periphery of the riser 54 and into enlarged separation zone 58 above a dense fluid bed of catalyst 66. Vaporous products of conversion and stripping stream pass through cyclonic separators 68 provided with catalyst diplegs 70. In separator 68, entrained catalyst particles are separated from vaporous material for return by dipleg 70 to bed 66. Separated vaporous material passes through conduits 72 to plenum chamber 74 for withdrawal by conduit 76. Stripping gas such as steam is introduced to the bottom of bed 66 in stripping zone 60 by conduit 78 and stripped catalyst is removed therefrom by conduit 62 for transfer to a catalyst regeneration zone (not shown).

What is claimed is:

1. A nozzle apparatus for injecting a liquid hydrocarbon feedstock into a catalytic conversion zone which comprises:
   (a) at least two confined passageways arranged to provide parallel fluid flow;
   (b) a first flow restriction means concentric with an affixed to the downsteam end of each confined passageway;
   (c) at least two annular passageways, each of said annular passageways having a detached confined passageway extending longitudinally through a portion thereof in concentrically spaced relationship
   (d) a second flow restriction means concentric with and affixed to the upstream end of each annular passageway; and
   (e) a third flow restriction means wherein said confined passageways communicate with each other at the upstream end by means of a first common flow space defined at the downstream end of said first common flow space by said third flow restriction means, said first common flow space containing therein means for deflecting said liquid hydrocarbon feedstock entering said first common flow space.

2. A nozzle apparatus according to claim 1, wherein the confined passageways and the annular passageways have a tubular configuration.

3. A nozzle apparatus according to claim 2, wherein the second flow restriction means is an annular orifice.

4. A nozzle apparatus according to claim 1, wherein the first flow restriction means is a discharge orifice.

5. A nozzle apparatus according to claim 1, wherein the first flow restriction means is a perforated plate having from 3 to 6 circular perforations.

6. A nozzle apparatus according to claim 1, wherein the downstream end of each annular passageway terminates not more than about 2 diameters downstream from said first flow restriction means, said diameters being a distance equal to the inside diameter of said annular passageway.

7. A nozzle apparatus according to claim 1, wherein the number of confined passageways and annular passageways is from 2 to 7.

8. A nozzle apparatus according to claim 1 wherein the number of confined passageways and annular passageways is 7.

9. A nozzle apparatus according to claim 1 wherein said annular passageways communicate with each other at the upstream end by means of a second common flow space defined at the downstream end of said second common flow space by said second flow restriction means.

10. A nozzle apparatus according to claim 9 wherein said third flow restriction means is affixed to a base plate, wherein said base plate defines the upstream end of said first common flow space.

* * * * *